Aug. 25, 1970  H. FREEDMAN  3,525,462
DENTAL FLOSS HOLDER AND DISPENSER
Filed May 10, 1967  2 Sheets-Sheet 1
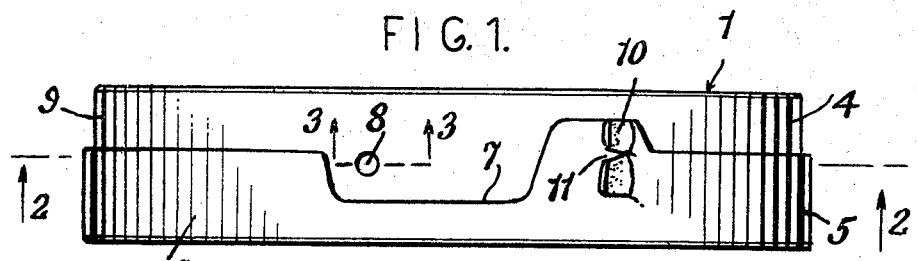
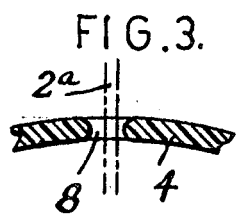
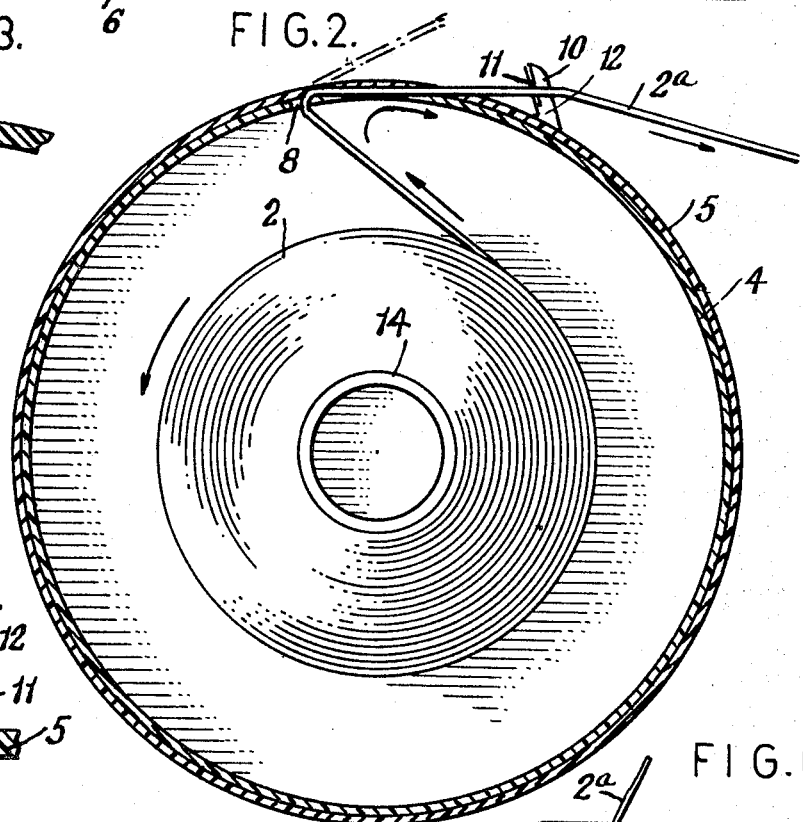
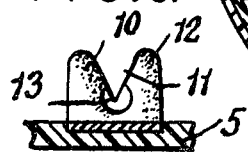
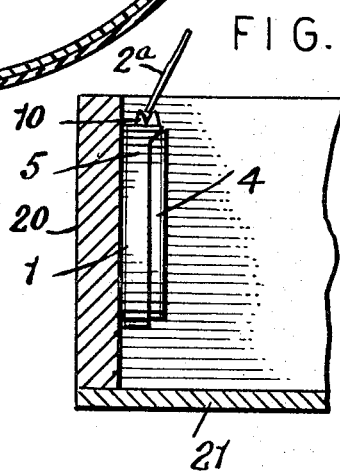
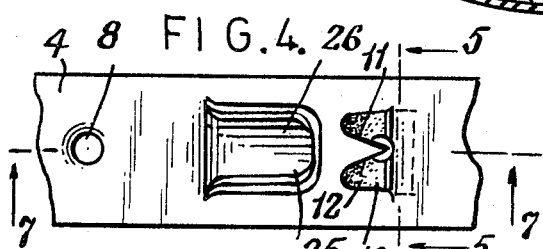
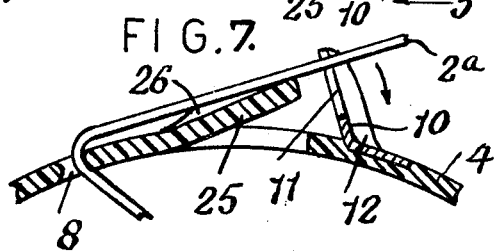
INVENTOR.
Hyman Freedman

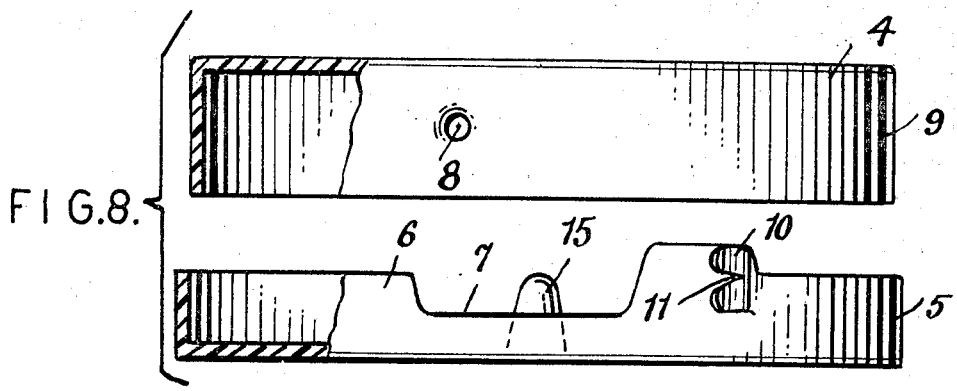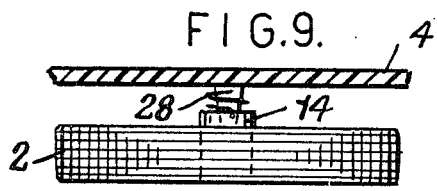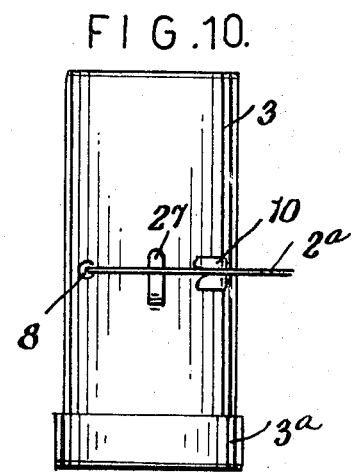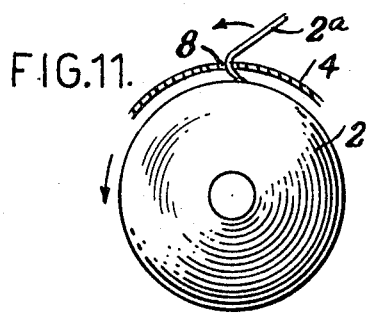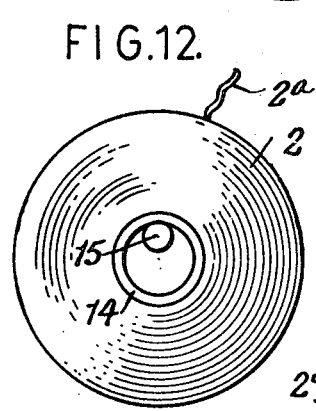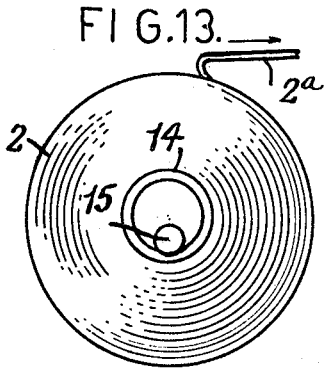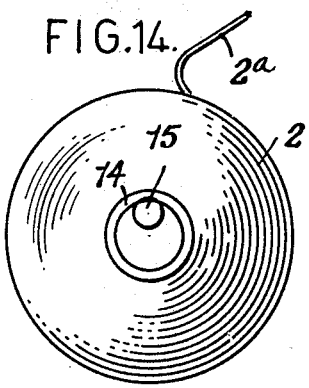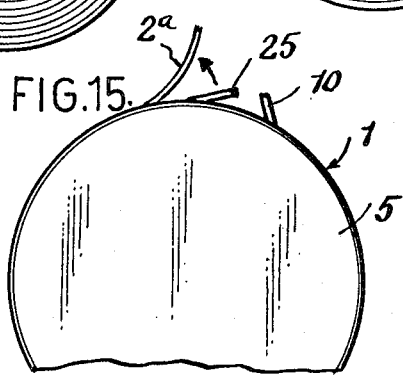
INVENTOR.
Hyman Freedman

United States Patent Office 3,525,462
Patented Aug. 25, 1970

3,525,462
DENTAL FLOSS HOLDER AND DISPENSER
Hyman Freedman, 200 W. 58th St.,
New York, N.Y. 10019
Filed May 10, 1967, Ser. No. 637,381
Int. Cl. B26f 3/02
U.S. Cl. 225—21                    8 Claims

ABSTRACT OF THE DISCLOSURE

A holder and dispenser for dental floss comprising a cylindrical closed container, preferably composed of transparent material, holding a rotative roll or spool of dental floss and from which roll or spool the floss is drawn out to required length and severed as needed. The container has a hole in its wall through which the end of the floss is drawn to bring it to a cutter located on the outside of the wall of the container and against which the floss is pulled to sever it.

After the severance of the floss takes place, the part of the floss that is located on the outside of the container and remains attached to the roll, is caused to move away from the surface of the container so that as that end of the floss is extended it becomes readily engageable by the fingers preparatory to drawing it out to the required length for the next severance.

The invention also contemplates the provision of means by which the container can be mounted and resistance may be imparted to the roll to facilitate the one-handed operation of the dispenser and to also aid in forcing the end of the floss in a direction away from the body of the container.

---

It is an object of the invention to provide means by which a dental floss holder and dispenser can be held either in the hand or attached to a support such as the wall of a drawer, or mounted at any suitable location such as in a medicine chest or other cabinet, and which will effectively permit the withdrawal and severance of the dental floss in the desired lengths.

It is an object of the invention to provide in an article of this character means by which the loose or free end of the dental floss, after the severance of the length of floss from a contained roll, will be moved away from the surface of the roll holder so that such end of the floss, which normally tends to cling to the surface of the holder, will become extended and rendered readily available for the subsequent withdrawal and severance operation.

In the accompanying drawings, wherein illustrative embodiments of the invention are disclosed:

FIG. 1 is an edge view of a holder and dispenser for dental floss, constructed in accordance with the invention;

FIG. 2 is a sectional view, taken substantially on the line 2—2 of FIG. 1, looking in the direction of the arrows;

FIG. 3 is a sectional view, taken substantially on the line 3—3 of FIG. 1, looking in the direction of the arrows;

FIG. 4 shows a portion of the holder provided with a projecting, angularly positioned, springy tongue for moving the end of the floss away from the body of the container after a section of the floss has been detached;

FIG. 5 is a sectional view, taken substantially on the line 5—5 of FIG. 4, looking in the direction of the arrows;

FIG. 6 shows the holder and dispenser attached to the wall of a drawer or similar support;

FIG. 7 is a sectional view taken substantially on the line 7—7 of FIG. 4, looking in the direction of the arrows;

FIG. 8 is an exploded view of the holder, with parts in section;

FIG. 9 shows spring torsion means for applying tension on the roll of floss;

FIG. 10 shows another type of holder provided with a spring tongue extending cross-wisely of the roll of floss, for moving the end of the floss away from the body of the holder to render such end readily accessible;

FIG. 11 shows the end of the floss becomes extended from the side of the holder after the severance of a piece of the floss from the roll;

FIGS. 12 to 14 inclusive show the gravity action on the roll of floss when the roll is mounted on a small-diameter pin in the holder; and FIG. 15 shows the action of the spring tongue on the end portion of the floss.

Referring to the drawings, 1 indicates generally one type of holder or container in which a roll 2 of the dental floss is contained. Another type of container is shown at 3 in FIG. 10. In a container of the shape shown in FIGS. 1 and 2, the roll of floss, which may be in the form of a thread or tape, is in the form of a relatively flat and large-diameter disk, while the spool of floss that is accommodated in the holder 3 is of smaller diameter and greater length. The present invention is applicable to both types of container. The container shown in FIG. 1 comprises a body 4 in the form of a relatively shallow cup and a cover member 5 is fitted over and closes the body. The cover 5 is telescopically fitted on the body 4 with a frictional fit which permits rotative movement of the two parts of the container relatively to one another but with sufficient friction between them to cause the cover and body to retain any position of rotative adjustment in respect to one another until manually shifted.

The skirt portion or side wall 6 of the cover member 5 is provided with a notch 7 for clearance with a hole 8 in the side wall 9 of the body of the container and through which the end 2a of the dental floss drawn from the roll emerges.

Provided on the wall of the cover is a projecting cutter 10 having a notch 11 into which the portion 2a of the floss enters and which, by a pull exerted on it, is severed by the cutter. The cutter is arranged tangentially or obliquely to the peripherally disposed wall of the container in order to facilitate the cutting operation. As will be seen in FIGS. 4 and 5 the back surface of the cutter is preferably covered with the plastic coating 12, only the apex area of the metal part in the notch 11 being exposed for cutting, as shown at 13. This arrangement serves to protect the hands should they contact with the cutter while the fingers grasp the loose end of the floss preparatory to drawing out a piece of the floss and detaching it. The base of the cutter may be mounted by being embedded in the wall of the cover.

As will be seen in FIG. 3, the hole 8 through which the floss is drawn from the roll 2, has its edge made smooth and rounded to avoid friction with the floss as it is drawn through the hole 8, and to also avoid the scraping off of the wax with which the floss is coated. The roll 2 of floss is provided with a hollow or tubular core 14 which receives a pin or peg 15 shown in FIG. 8 to thereby center the roll in the container. This pin or peg 15 may be provided on either the cover or body of the container or on both of these parts.

As will be seen in FIG. 2, the floss is drawn from the roll in a certain manner as indicated by the arrows. That is to say, the floss is drawn from the bottom of the roll, causing the roll to rotate counter-clockwise during the withdrawal of the floss from it, and the floss drawn from the roll is pulled away from the roll in the opposite direction as indicated by the upper arrows in FIG. 2.

The above-mentioned disposition of the roll and the manner in which the floss is drawn from it is of importance since the wax-coated floss tends to follow the curvature which it assumes on the roll because of its being wound in the roll formation, even after it is straightened out while it is being pulled out and severed. The result of this hystersis is that after a piece of the floss has been detached, the end that remains attached to the roll will attempt to restore its curvature and in doing so will swing away from the surface of the container, thus rendering this end extended and readily engageable by the fingers preparatory to withdrawing and severing the next section of the floss. This will be apparent from FIG. 12 wherein the upper arrow shows the swing of the floss-end 2a as it attempts to resume its former curvature.

From the foregoing, the operation of the structure of FIG. 1 will be readily apparent. For one-handed operation it is desirable that the container be fixedly mounted and this can conveniently be done by mounting the same upon the wall of a drawer 21 for example, as shown in FIG. 6. The hole 8 and the cutter 10 are disposed at the top of the container when the container is so mounted, and to detach a piece of the floss, the end 2a thereof is pulled through the hole 8 to the required length; it is drawn through the notch 11 of the cutter 10 and with a pull exerted downwardly on the end of the floss, the section of it becomes detached.

One of the difficulties encountered in floss dispensers is the tendency of the short projecting end of the floss, after the detachment of a piece from the roll, to somewhat tenaciously cling to the surface of the container so that it is then difficult to finger-engage and pick up the end of the floss when it is desired to draw out and sever another section of the same from the roll. It is therefore desirable that means be provided by which this end of the floss will be extended out from the surface of the container and be positioned for easy grasping after a piece of the floss has been severed.

With the arrangement shown in FIG. 1 and the withdrawal of the floss from a roll arranged to rotate as shown in FIG. 2, the end of the floss remaining attached to the roll will tend to swing away from the body of the container so that such end will be accessible. Thus, in the use of the device, particularly when attached to a drawer as heretofore described, the floss is drawn out, cut off, and the end of the floss that remains on the roll becomes extended away from the container for finger-engagement preparatory to withdrawing and severing the next piece.

By the rotative adjustment of one of the parts of the container relatively to its other part, so that the hole 8 is brought closer to or farther away from the cutter 10, the length of the piece of floss projecting from the hole 8 after the severance of a piece can be regulated since some users prefer a short end and others a longer end.

The parts of the container, excepting the metallic plate incorporated in the cutter, can be composed of transparent plastic material so that the amount of floss remaining on the contained roll will always be visible through the body of the container.

When a positive means for moving the attached end of the floss away from the surface of the container is desired, the container may be provided with an angular, stamped-out springy finger or tongue 25 as shown in FIG. 4, located between the hole 8 and the cutter 10 which can be mounted either on the cover as in FIG. 1 or fixedly mounted on the body of the container as shown in FIG. 4. In this embodiment, the tongue 25 extends longitudinally of the body of the container and its upper surface is concaved as shown at 26 to aid in guiding the floss into the notch 11 of the cutter 10. In this arrangement, the end 2a of the floss passes along the concave surface 26 in the top of the springy tongue 25 and is drawn into the notch 11 of the cutter substantially as shown in FIG. 7 and by a downward pull exerted on the end 2a of the floss, the same will be severed and become detached from the roll. When the floss is pulled downwardly in the cutter 10, it will depress the spring finger or tongue 25 and as soon as the piece of floss is severed and the compression of the floss on the tongue 25 is relieved, the tongue 25, springing back to its normal angular position as in FIG. 7, will act to extend the end of the floss that is attached to the roll, to a position somewhat as shown in FIG. 15, so that said end of the floss will then be so located that it can be readily grasped when it is desired to withdraw and sever another section of the floss from the roll.

A variation of the above is shown in FIG. 10, wherein a similar springy finger or tongue 27 is shown as extending crosswisely of the direction of pull of the floss. The arrangement is shown as applied to a small diameter container or vial 3 containing a spool of the floss and closed at one end by a cap 3a, but this disposition of the springy tongue or finger as well as that shown at 25 in FIG. 4 may be applied to either type of container disclosed herein. The finger 25 acts to move the end of the floss outwardly at the conclusion of the cutting operation. The tongues 25 and 27 may be stamped out of the body of the container or they may be otherwise attached.

It may be found desirable to provide additional means for increasing the resistance of the roll to rotation when the end of the floss is being pulled during the severing operation. In FIG. 9 is shown means for providing resistance to the rotation of the roll 2 when the end of the floss is being drawn therefrom, said means being in the form of a torsional spring 28, which has one end engaging the pin or peg 15 and its other end in engagement with the core 14 of the roll. As the floss is drawn from the roll, winding up of the spring caused by the pull exerted on the floss, is opposed by the bias of the spring and tension is built up, and a resistance to the rotation in the withdrawal direction, takes place. Then, when the thread is severed, the end remaining attached to the roll is pulled back by the retractive action of the spring and this causes the said end of the floss to be thrown out away from the surface of the body of the container.

A somewhat similar result can be obtained by the arrangement shown in FIGS. 12 to 14 inclusive. Therein, the pin or peg 15 provided on the body or cover member of the container is made in relatively small diameter as compared to the internal diameter of the tubular core 14 of the roll. When the holder is mounted in a drawer or on another surface with the hole 8 and cutter 10 directed upwardly, the roll will appear as shown in FIG. 12, the pin or peg 15 being caused by gravity exerted on the roll, to be in an upper position relatively to the core. When a pull is exterted on the end portion 2a of the floss, the roll 2 will be lifted so that the pin or peg will then be located at the lower portion of the core as shown in FIG. 13. When the floss is severed, the roll will then drop down under the force of gravity and this descent of the roll will cause the end 2a thereof to be slightly pulled and thus be swung away from the surface of the container in which the roll is housed.

As heretofore stated, the container may be mounted in a drawer or on any other suitable support, the mounting being effected by the use of a pressure-sensitive adhesive on one of the parts of the container or the mounting of the container may be had by any other suitable mounting means. The severance of the floss is a one-handed operation; the end of the floss that remains attached to the roll is, after severance of a piece, caused to project away from the surface of the container, thereby avoiding the nuisance of attempting to pick up the end of the floss that tenaciously and contiguously adheres to the surface of the container. Other advantages will be readily apparent to those skilled in this art and particularly to dentists and other extensive users of dental floss. While I have herein mentioned the fact that the holder and dispenser is primarily intended for use in connection with dental floss, it can readily be used for other purposes.

What I claim is:

1. A dispenser for dental floss comprising:
   (a) a container for a roll of the floss,
   (b) said container having a peripheral side wall provided with an aperture through which floss emerges from the roll,
   (c) a cutter mounted on the outer face of the side wall and which permits the floss to be severed as the floss is drawn from the roll,
   (d) a flexible element formed out of the peripheral wall of the container and having extension along the outside of the container between the aperture and the cutter,
   (e) a flexible element being disposed behind that end part of the floss that extends substantially parallel to the peripheral wall of the container and is on its way to the cutter, and
   (f) the flexible element being biased in a manner to push such end portion of the floss outwardly and away from all parts of the container body when the severance occurs.

2. A dispenser according to claim 1 wherein the container is a transparent plastic holder in which the roll of dental floss is rotatively contained, the container having a removable cover member, the cutter on the outside of the container being oblique to the side wall on which it is situated, the flexible element being a springy tongue that has a free end directed toward the cutter, said tongue being effective to push said part of the floss that is located between the aperture and the cutter, said tongue being effective to push said part of the floss away from the surface of the container after the severance of the floss by the cutter to thereby free said part of the floss from contact with all parts of the container and permit said part of the floss to be freely finger-engaged.

3. A dispenser according to claim 1, wherein the flexible element is a tongue stamped out of the container and which tongue extends parallel to the direction of withdrawal of the floss from the roll.

4. A dispenser according to claim 3, wherein the flexible element is a tongue extending transverse to the direction of withdrawal of the floss from the roll.

5. A dispenser for wax coated dental floss comprising:
   (a) a container including a peripheral wall having an upwardly directed aperture through which dental floss carried on a roll in the container is drawn to be severed,
   (b) the roll being mounted in the container in a manner to have an up-and-down movement with respect to the container,
   (c) the roll being moved upwardly when a pull is exerted on the end of the floss on the outside of the container,
   (d) the roll descending by gravity within the container in a manner to cause the portion of the floss then exposed on the outside of the container to be moved away from contact with the outside surface of the peripheral wall.

6. A container according to claim 5, wherein the container has a small-diameter peg and the roll has a large diameter core so that the roll may have the said up-and-down movement in the container, the downward movement being gravitational.

7. A dispenser for dental floss comprising:
   (a) a container including a peripheral wall having an aperture through which floss carried on a roll in the container is drawn to be severed,
   (b) a cutter mounted on the outer face of the peripheral wall to permit the floss to be severed as the floss is drawn from the roll in a direction transverse to the axis of the roll, and
   (c) a flexible element being disposed on the outer surface of the wall between the aperture and the cutter,
   (d) the flexible element being biased in a manner to push the end portion of the floss outwardly and away from the container parts when the severance occurs.

8. A dispenser for dental floss comprising:
   (a) a container including a peripheral wall having an aperture through which floss carried on a roll in the container is drawn,
   (b) a cutter mounted on the peripheral wall and into which the floss is drawn to sever a portion thereof from the end of the floss, and
   (c) means operative on the exposed end portion of the floss upon severance of a portion thereof to cause said exposed end portion to move outwardly and away from all outside parts of the container whereby said exposed end portion will be free from adherence to the container and will be ready for easy grasping when it is desired to withdraw another section of the floss from the roll.

References Cited
UNITED STATES PATENTS

| | | | |
|---|---|---|---|
| 2,434,776 | 1/1948 | Van Cleef et al. | 225—80 X |
| 2,494,106 | 1/1950 | Rengo | 225—47 X |
| 2,547,253 | 4/1951 | Bowers | 225—44 |
| 2,547,569 | 4/1951 | Erhardt | 225—47 X |
| 2,709,049 | 5/1955 | Weis | 225—47 X |
| 2,824,709 | 2/1958 | Macy | 225—41 X |
| 2,929,540 | 3/1960 | Carey | 225—51 X |
| 3,021,987 | 2/1962 | Scholtz | 225—44 X |
| 3,086,309 | 4/1963 | Katz. | |
| 3,132,783 | 5/1964 | Duncan | 225—51 X |
| 3,144,970 | 8/1964 | Beschmann | 225—39 |

FRANK T. YOST, Primary Examiner

U.S. Cl. X.R.
225—44, 47; 242—55.2